United States Patent [19]

Turunen

[11] Patent Number: 4,487,422

[45] Date of Patent: Dec. 11, 1984

[54] VEHICLE SPLASH APRON

[76] Inventor: Pekka J. Turunen, Sähköttäjänk. 2 F 71, 00520 Helsinki, Finland

[21] Appl. No.: 403,656

[22] PCT Filed: Dec. 1, 1981

[86] PCT No.: PCT/FI81/00088

§ 371 Date: Jul. 30, 1982

§ 102(e) Date: Jul. 30, 1982

[87] PCT Pub. No.: WO82/01857

PCT Pub. Date: Jun. 10, 1982

[30] Foreign Application Priority Data

Dec. 1, 1980 [FI] Finland ................................ 803719

[51] Int. Cl.³ .............................................. B62D 25/18
[52] U.S. Cl. .............................................. 280/154.5 R
[58] Field of Search ................. 280/154.5 R, 154.5 A, 280/156, 157, 154, 153

[56] References Cited

U.S. PATENT DOCUMENTS

| 1,662,545 | 3/1928 | Spelta | 280/157 |
|---|---|---|---|
| 1,709,060 | 4/1929 | Candy | 280/154 |
| 1,899,937 | 3/1933 | Brown . | |
| 2,605,119 | 7/1952 | Earnest | 280/154.5 R |
| 4,326,727 | 4/1982 | Rock | 280/154.5 R |

FOREIGN PATENT DOCUMENTS

| 264208 | 9/1913 | Fed. Rep. of Germany . | |
|---|---|---|---|
| 534262 | 9/1931 | Fed. Rep. of Germany . | |
| 1480377 | 10/1969 | Fed. Rep. of Germany . | |
| 2045212 | 3/1971 | Fed. Rep. of Germany . | |
| 568576 | 3/1924 | France | 280/156 |
| 568184 | 3/1924 | France | 280/153 |
| 640274 | 7/1928 | France | 280/157 |
| 725061 | 5/1932 | France . | |
| 2294902 | 7/1976 | France . | |
| 249210 | 4/1926 | Italy | 280/157 |
| 32519 | 3/1912 | Sweden . | |

*Primary Examiner*—Joseph F. Peters, Jr.
*Assistant Examiner*—Michael Mar
*Attorney, Agent, or Firm*—McGlew and Tuttle

[57] ABSTRACT

A vehicle splash apron adapted to be connected behind a vehicle tire. The apron comprises a plurality of vertically elongated flap strips supported in a depending side-by-side relationship. Every other one of the flap strips are more easily movable by a draft due to the motion of the vehicle than the remainder of the flap strips to cause the formation of gaps between adjacent flap strips.

6 Claims, 7 Drawing Figures

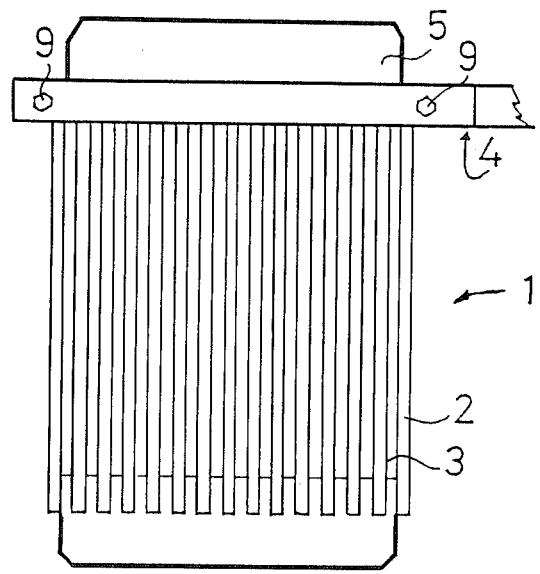
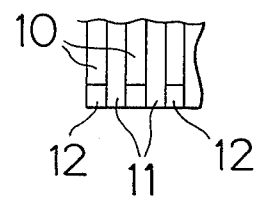
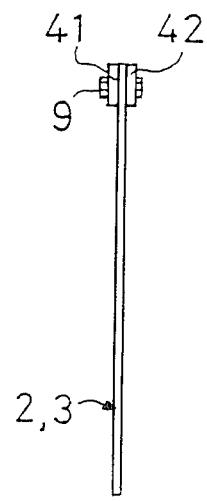
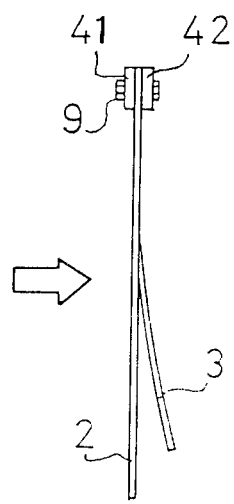

VEHICLE SPLASH APRON

FIELD AND BACKGROUND OF THE INVENTION

The present invention relates to a vehicle splash apron, commonly called a mud flap, which is connected behind a tire and to the frame structure or equivalent of a vehicle.

Splash aprons are designed for preventing pebbles and other loose material, which are hurled off the road surface by the vehicle tires, from being flung around, so that no annoyance, harm or damage is caused to other vehicles and passengers on the road. The use of splash aprons in vehicles improves road safety.

The currently used splash aprons have a uniform and stationary structure. Such splash aprons cause harmful air flows and whirls, which send fine dust or fog from the road surface onto the windscreens of other vehicles moving on the road. The pebbles flinged from the tires towards the splash guards do not loose enough of their dynamic energy, but continue their motion after bouncing off the splash aprons and consequently cause a danger for other vehicles.

Stationary splash aprons increase the body draft of the vehicle, and thus also increase fuel consumption. Moreover, the average service life of splash aprons is comparatively short.

SUMMARY OF THE INVENTION

The object of the present invention is, among other things, to eliminate the aforementioned drawbacks and to realize a splash apron which has a simple structure and low manufacturing costs.

Accordingly, another object of the present invention is to provide a splash apron which comprises a plurality of flap strips which are connected together.

Another object of the invention is to provide such a splash apron including means for rendering at least some of the flap strips more easily movable by a draft due to the motion of the vehicle than the remainder of the strip so that gaps are formed in the spaces between at least some of the flap strips when the vehicle moves.

Among the advantages of the present invention, the following can be pointed out. The flaps of the splash apron are made of an elastic and flexible material. They are arranged to bend in the driving draft in such a fashion that every second flap or strip is bent more than the rest. Thus there are formed vertical gaps in the splash apron and the air drag is considerably reduced.

Such separate flaps yield effectively when hit by a pebble hurled from a tire so that the pebble immediately looses speed and falls on the road. During winter time the formation of icy lumps in the splash aprons is prevented explicitly owing to their flexible fibrous and/or lamellated structure. Thus the strain directed towards the splash aprons is also diminished and their wear resistance is increased.

BRIEF DESCRIPTION OF THE DRAWINGS

In the following the present invention is described in detail with reference to the appended drawings, in which:

FIG. 1 is an illustration of a preferred embodiment of the present invention seen from the back of a vehicle;

FIG. 2 is an illustration of the splash apron of FIG. 1, seen from the side, when a driving draft is not present.

FIG. 3 is an illustration of the splash apron of FIG. 1, seen from the side, when a driving draft is present;

FIG. 7 is a fragmentary view showing the lower parts of flaps forming a splash apron according to another embodiment of the invention.

DESCRIPTION OF THE PREFERRED EMBODIMENTS

Figure 4:
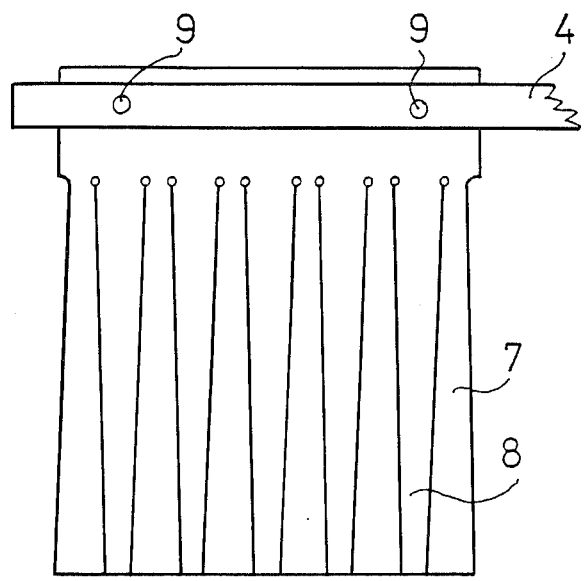
FIG. 4 is an illustration of another preferred embodiment of the splash apron of the invention.

In the preferred embodiment of the splash apron according to FIGS. 1 and 2, the splash apron 1 is formed of straight, substantially vertical elongated, fibrous flaps or strips 2, 3, which are attached side-by-side in a row to a suitable supporting member 4. The supporting member can further be attached by conventional methods behind the tire 5, seen from the driving direction, to the frame structure or equivalent of a vehicle, which is not illustrated in the drawing. The fibrous flaps 33 of the splash apron are alternately long and short, respectively. The difference in length in comparison with the total length of the splash apron is not great, preferably about 5–15%, which depends on the material to be used. Advantageously the flaps 2, 3 are manufactured of a flexible and facile, water-repellent artificial fiber material, which should be particularly resistant to corrosion.

When a vehicle provided with the aforementioned splash aprons moves forwardly, the air flow separates the shorter and lighter flaps 3 from the longer and heavier flaps 2, as is seen in FIG. 3. Thus there are formed vertical air gaps in the splash apron.

In the previous embodiment, the fibrous flaps can also be suitably divided into alternating groups of short and long flaps that is every other one of the flaps is short.

The air gaps in the splash apron of the invention can also be created as shown in FIG. 7 so that at the lower end of every second flap or group of flaps 10 there is attached a suitable leaden weight or equivalent 12, in which case the lighter flaps 11 move more easily in accordance to the air flow.

In the embodiment of FIGS. 1–3 the fibrous flaps of the splash apron fall directly downwardly from the supporting member. They can also be arranged to fall downwardly in a fan-shaped fashion, in which case the air gaps are arranged without any further measures between the flaps 2, 3 of equal length.

In FIG. 4 is presented another splash apron according to the invention, which splash apron consists of adjacent ribbon-like or lamellated flaps 7, 8. Every second flap 7 becomes wider in the downward direction from the supporting member 4 or its immediate neighbourhood, and respectively the remaining flaps 8 become narrower. Owing to the effect of a driving draft, the flaps 7 which are wide at the bottom are bent backwardly and thus separated—due to greater air resistance—from the flaps 8 which are narrow at the bottom. Thus the desired vertical or roughly vertical air gaps are formed in the splash apron. This is also due to the narrower web of the flaps 7 which connect the top of each flap to a common cross part as shown in FIG. 4.

The splash apron of FIG. 4 can also be realized so that the ribbon-like or lamellated flaps are partly arranged in overlapping or roughly adjacent fashion. In that case the first alternating flaps 8, located partly at the front, could be of equal width, whereas the second alternating flaps 7, located partly at the back, could still become wider towards the bottom.

Figure 5:
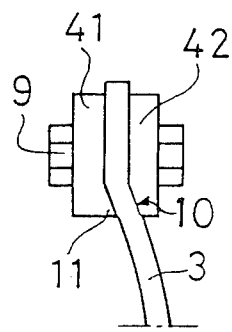
FIGS. 5 and 6 show details of a third embodiment of the splash apron of the invention.
Figure 6:
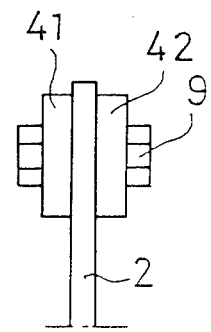

The splash apron is attached in a conventional fashion to a suitable supporting member, and by means of the member further behind the tire or directly to the body of the vehicle. In FIGS. 5 and 6 are illustrated details of a splash apron of the invention, where a certain type of supporting member is utilized.

The fibrous, ribbon-like or lamellated flaps of the splash apron can be pressed in between the supporting pieces 41, 42 by means of bolted joints 9 or similar joints. In the supporting pieces there are respectively arranged grooves 10 and brackets 11 to match those alternating flaps or groups of flaps, which are directed slightly backwardly from the plane of the splash apron (FIG. 6) in order to create or reinforce the air gaps. FIG. 5 represents a side-elevation view of a similar point as described above, and FIG. 6 represents a respective view for example at the next flap of the splash apron where the grooves and brackets do not exist and where the flap of the flash apron falls directly downwardly when in the resting position.

The splash apron of the invention can be manufactured of any flexible and durable material, such as rubber or a suitable type of plastic. The whole of the splash apron can be made of one piece of material by suitably cutting the fibrous, ribbon-like or lamellated flaps therefrom and by leaving the upper part unbroken as is seen in FIG. 4. On the other hand, the flaps can also be manufactured separately, and what is more, of different materials. They can be arranged for instance so that every second flap is made of a more flexible material than the rest.

In the above the present invention has been described with reference to a few preferred embodiments only. It is, however, by no means intended to limit the scope of the invention to include only these embodiments, but several modifications thereto are possible within the invention specified in the following patent claims.

I claim:

1. A vehicle splash apron which is adapted to be connected behind a vehicle tire in a driving direction of the vehicle comprising:
   a plurality of substantially vertically elongated flap strips; and means for supporting the upper portion of said flap strips in a depending side-by-side relationship with abutting side edges;
   wherein every other one of said flap strips in said side-by-side relationship forming a first group of flap strips, the remainder of said flap strips forming a second group of flap strips, and means for rendering said first group of flap strips more easily movable by a draft due to the motion of a vehicle to which said flap strips are connected than said second group of flap strips to cause the formation of gaps between said first and second groups of flap strips.

2. A vehicle splash apron according to claim 1 wherein said rendering means comprises said first group of flap strips having a different length than said second group of flap strips.

3. A vehicle splash apron according to claim 1 wherein said rendering means comprises said second group of flap strips each having a weight connected to an end thereof.

4. A vehicle splash apron according to claim 1 wherein said rendering means comprises said first group of flap strips increasing in width in a downward direction while said second group of flap strips decreasing in width in a downward direction.

5. A vehicle splash apron according to claim 1 wherein all of said flap strips are made of the same material.

6. A vehicle splash apron according to claim 1 wherein said rendering means comprises said first group of flap strips being made of more flexible material than said second group of flap strips.

* * * * *